United States Patent
Asada et al.

(10) Patent No.: US 8,522,507 B2
(45) Date of Patent: Sep. 3, 2013

(54) CONCRETE PLATFORM PRODUCTION PROCESS, CONCRETE PLATFORM, AND CONNECTING MEMBER

(75) Inventors: Naohiro Asada, Tokyo (JP); Yumi Tanaka, Tokyo (JP); Takeo Takakura, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/148,812

(22) PCT Filed: Jan. 5, 2010

(86) PCT No.: PCT/JP2010/050018
§ 371 (c)(1),
(2), (4) Date: Aug. 10, 2011

(87) PCT Pub. No.: WO2010/150559
PCT Pub. Date: Dec. 29, 2010

(65) Prior Publication Data
US 2011/0308183 A1   Dec. 22, 2011

(30) Foreign Application Priority Data
Jun. 24, 2009  (JP) .................................. 2009-149634

(51) Int. Cl.
*E04G 21/00* (2006.01)
*E04B 1/18* (2006.01)
*E02D 27/44* (2006.01)

(52) U.S. Cl.
USPC ........... 52/742.14; 52/745.2; 52/251; 52/414; 52/295; 249/10; 248/679

(58) Field of Classification Search
USPC .................. 52/745.2, 742.14, 250, 251, 414, 52/295, 432; 264/31; 249/10; 248/678, 248/679, 346.01; 405/229
See application file for complete search history.

(56) References Cited

U.S. PATENT DOCUMENTS

| | | | | |
|---|---|---|---|---|
| 1,757,077 A | * | 5/1930 | Eiserloh | 52/262 |
| 2,174,216 A | * | 9/1939 | Rosenzweig | 248/612 |
| 4,081,935 A | * | 4/1978 | Wise | 52/236.8 |
| 4,328,651 A | * | 5/1982 | Gutierrez | 52/293.1 |

(Continued)

FOREIGN PATENT DOCUMENTS

| | | |
|---|---|---|
| CN | 2615114 Y | 5/2004 |
| CN | 2663554 Y | 12/2004 |

(Continued)

OTHER PUBLICATIONS

English translation of the "Search Report for Taiwanese Patent Application No. 099100722", Sep. 6, 2012.

(Continued)

*Primary Examiner* — Brent W Herring
(74) *Attorney, Agent, or Firm* — Manabu Kanesaka; Kenneth M. Berner; Benjamin J. Hauptman (57) ABSTRACT

Provided is a process for producing a concrete platform to which an object to be supported is fixed, including: a step of forming form having a pair of concrete side walls and a concrete bottom slab that connects the pair of side walls (S2); a step of setting the form on a plurality of piers (S3); and a step of pouring concrete into the form that is set on the plurality of piers (S6).

9 Claims, 5 Drawing Sheets

(56) References Cited

U.S. PATENT DOCUMENTS

| | | | | |
|---|---|---|---|---|
| 4,363,200 A * | 12/1982 | Goldenberg | ............ | 52/251 |
| 4,409,764 A * | 10/1983 | Wilnau | ............ | 52/127.3 |
| 5,060,436 A * | 10/1991 | Delgado, Jr. | ............ | 52/295 |
| 5,240,224 A * | 8/1993 | Adams | ............ | 249/93 |
| 6,119,413 A * | 9/2000 | Shaw et al. | ............ | 52/167.1 |
| 6,164,615 A | 12/2000 | Basham | | |
| 6,293,063 B2 * | 9/2001 | Van Doren | ............ | 52/251 |
| 7,124,550 B1 * | 10/2006 | Deming | ............ | 52/745.21 |
| 7,143,554 B2 * | 12/2006 | Sachs et al. | ............ | 52/251 |
| 7,254,919 B2 * | 8/2007 | Lutz et al. | ............ | 52/92.2 |
| 7,487,597 B2 * | 2/2009 | Diaz | ............ | 33/562 |
| 7,891,110 B2 * | 2/2011 | Diaz | ............ | 33/562 |
| 2003/0029130 A1 | 2/2003 | Humphrey | | |
| 2010/0107546 A1 * | 5/2010 | Diaz | ............ | 52/699 |

FOREIGN PATENT DOCUMENTS

| | | |
|---|---|---|
| CN | 200961265 Y | 10/2007 |
| CN | 2011697801 Y | 12/2008 |
| DE | 298 06 932 U1 | 7/1998 |
| JP | S59-006495 | 1/1984 |
| JP | S62-045837 A | 2/1987 |
| JP | H06-055522 | 3/1994 |
| JP | H06-170818 | 6/1994 |
| JP | H07-052132 | 2/1995 |
| JP | H07-052133 | 2/1995 |
| JP | H10-311049 | 11/1998 |
| JP | 2001-027281 | 1/2001 |
| JP | 2006-322215 A | 11/2006 |
| TW | 299381 | 3/1997 |
| TW | 329849 | 4/1998 |
| TW | 430820 | 4/2001 |
| TW | M260586 | 4/2005 |
| TW | M262522 | 4/2005 |

OTHER PUBLICATIONS

Chinese Patent Office, "Office Action for CN 201080009248.4", Apr. 27, 2013.

European Patent Office, "Extended European Search Report for EP 10 79 1881", May 31, 2013.

* cited by examiner

CONCRETE PLATFORM PRODUCTION PROCESS, CONCRETE PLATFORM, AND CONNECTING MEMBER

RELATED APPLICATIONS

The present application is National Phase of International Application No. PCT/JP2010/050018 filed Jan. 5, 2010, and claims priority from Japanese Application No. 2009-149634, filed Jun. 24, 2009, the disclosure of which is hereby incorporated by reference herein in its entirety.

TECHNICAL FIELD

The present invention relates to, in particular, a process for producing a concrete platform onto which a heavy structure, such as a turbine, a generator, and so forth, is mounted, to a concrete platform, and to a connecting member.

BACKGROUND ART

In general, a known concrete platform on which is mounted a heavy structure that vibrates during operation, such as a turbine, a generator, and so forth, is constructed with a large volume of mass concrete and reinforcing bars.

A beam etc. of a table-deck portion in such a concrete platform, onto which a heavy structure is mounted, is formed to have a larger cross-sectional area (for instance, having a width equal to or more than 2 m and a height equal to or more than 2 m) in comparison with a beam that is used for buildings such as condominiums etc., so as to be able to support a heavy load. At the same time, many metal parts used for fixing the above-mentioned heavy structure to the table-deck portion are embedded in the table-deck portion. The embedded metal parts can include templates, bolts, anchor blocks, and so forth.

Upon producing (hereinafter referred to as "building") the concrete platform as mentioned above, form is put in place, and fresh concrete is subsequently introduced inside the form, in other words, fresh concrete is poured.

Known form includes one that is removed after the concrete is poured (for example, see PTL 1) and one that makes up part of a concrete platform without being removed (for example, see PTL 2).

For example, when the concrete platform is built using the form described in PTL 1, in order to construct a reinforced concrete beam, which has a large sectional area, of the table-deck portion, the form, supports for supporting the form, scaffolding, and so forth are first put in place. Thereafter, fresh concrete is poured. Once the reinforced concrete beam has been constructed, the form, the support, the scaffolding, and so forth are removed.

For example, when the concrete platform is built using the form described in PTL 2, in other words, steel form, in order to construct a reinforced concrete beam, which has a large sectional area, of the table-deck portion, as in the case with PTL 1, fresh concrete is poured after the steel form, supports for supporting the form, scaffolding, and so forth are put in place first.

Although the supports, the scaffolding, and so forth are removed thereafter, the steel form is not removed and it makes up part of the concrete platform.

CITATION LIST

Patent Literature

{PTL 1} Japanese Unexamined Patent Application, Publication No. 2001-027281

{PTL 2} Japanese Unexamined Patent Application, Publication No. Shou 59-006495

SUMMARY OF INVENTION

Technical Problem

However, because the form, the supports, the scaffolding, and so forth are required in the process described in the above-mentioned PTL 1, there has been a problem in that the construction period required for building a concrete platform is extended. In particular, there have been problems in that the form and the supports for supporting the form must be put in place and then removed, which extends the construction period.

At the same time, because embedded metal parts that are embedded in the table-deck portion are required to be set at a prescribed accuracy, there has been a problem in that the construction period is extended even further.

On the other hand, because the steel form, which is fabricated in a factory, is used in the process described in the above-mentioned PTL 2, a reduction in the construction period at the building site of the concrete platform can be achieved.

However, when the steel form is used, because the steel form deforms upon pouring of the fresh concrete, additional separate supports are required for supporting the steel form. Therefore, the separate supports are required to be put in place and then removed, resulting in the problem that the construction period is extended.

Because the steel form is made of steel, the steel form is required to be produced in a factory, and this results in the need for transport in a container. Thus, there has been a problem in that, in comparison with conventional form made of wood, the cost of the transport etc. becomes high.

The present invention has been conceived to solve the problems described above, and an object thereof is to provide a concrete platform production process that is capable of reducing a construction period and capable of preventing an increase in the costs of building a concrete platform, as well as a concrete platform and a connecting member.

Solution to Problem

In order to realize the object described above, the present invention provides the following solutions.

A process for producing a concrete platform according to a first aspect of the present invention is a process for producing a concrete platform on which an object to be supported is fixed, including: a step of forming form having a pair of concrete side walls and a concrete bottom slab that connects the pair of side walls; a step of setting the form on a plurality of piers; and a step of pouring concrete into the form that is set on the plurality of piers.

According to a process for producing a concrete platform according to the first aspect of the present invention, the step of making the form and the step of building the plurality of piers can be conducted simultaneously, and at the same time, the form can be made at a different site from the construction site of a plurality of piers, in other words, the construction site of the concrete platform. Therefore, a reduction in the construction period, that is, the production period of the concrete platform, can be afforded.

Furthermore, because the form is made of concrete, the form is not required to be removed after the concrete has been poured into the form, and therefore, the construction period can be reduced.

On the other hand, when form made of steel plates is used, it is necessary to perform welding management, and it is necessary to make the form in a factory in order to ensure dimensional precision. In contrast, when form made of concrete is used, because the form can be made integrally, it is not necessary to perform welding management etc. Therefore, the site for producing the form is not limited to the factory; the form can be produced at a suitable site close to the construction site, and it is possible to reduce the costs related to transport of the form.

Furthermore, because concrete is poured after the form having the pair of side walls and the bottom slab has been set on the piers, a reduction in the size of a crane used for setting the form can be afforded compared with a case where the form into which concrete has been poured is set on the piers, or a case where a concrete table-deck portion from which the form has been removed after concrete has been poured is set on the piers.

In the process for producing a concrete platform according to the first aspect of the present invention, in the step of setting the form on the plurality of piers, the form may be set on the plurality of piers after a connecting member that connects each of the upper edge portions of the pair of side walls of the form by being placed on the upper edge portions is attached to the pair of side walls.

According to this configuration, by connecting each of the upper edge portions of the pair of side walls by the connecting member, a part of the cross-section of the form forms a box-structure; therefore, it is possible to prevent a reduction in the sectional stiffness of form due to the widening of the gap between the side wall edge portions (upper edges). Therefore, deformation of the form during pouring of the concrete is prevented, and no supports for supporting the form need to be set.

On the other hand, if steel form is used, in order to prevent a reduction in the sectional stiffness of the form, stiffening parts for maintaining the relative positions between the side walls and the bottom slab may be provided on the bonding portions between the side walls and the bottom slabs. However, if the stiffening parts are provided, because the internal cross-sectional area (internal space) of the form becomes smaller, the space available for arranging the reinforcing bars (internal space in the form) will be limited.

In this case, in the space for arranging the reinforcing bars of the form, the reinforcing bars will not be able to be arranged in the region in the vicinity of the bottom slab, where the bending stress acting thereon is large. As a result, the strength of the table-deck portion can be lowered. In the case of concrete form, which has a greater form thickness compared with steel form, the impact is particularly significant. This problem can be solved by connecting each of the upper edge portions of the pair of side walls by using the connecting member in the present invention.

In the process for producing a concrete platform according to the first aspect of the present invention, an attachment part that is partially embedded in concrete that is poured into the form so as to fix the object to be supported may be aligned with the connecting member in a positionable manner.

According to this configuration, because the arrangement positions of the attachment parts are maintained with the connecting member, it is possible to align the attachment parts easily and with high precision without using a separate massive template and temporary supporting members that temporarily support this template from above. Furthermore, the construction period can be reduced compared with a process where the attachment parts are arranged directly in the form and their arrangement positions are adjusted.

Here, the attachment part can include, for example, a metal part that is used for fixing a heavy structure that is mounted on the concrete platform, and can include an embedded metal part etc., such as an anchor bolt.

In the process for producing a concrete platform according to the first aspect of the present invention, the connecting member may be removed from the upper edge portions of the pair of side walls after the step of pouring concrete.

According to this configuration, it is possible to reuse the connecting member.

A concrete platform according to a second aspect of the present invention is produced by the process for producing a concrete platform according to the above-mentioned present invention.

According to the concrete platform of the second aspect of the present invention, by making the form from concrete, the form is not required to be removed, and it is possible to reduce the construction period compared with a case where form made of wood etc. is used.

In addition, when steel form is used, it is necessary to perform welding management, and it is necessary to make the form in a factory in order to ensure dimensional precision. In contrast, when form made of concrete is used, it is not necessary to perform welding management etc. Therefore, the site for producing the form is not limited to a factory; the form can be produced at a suitable site close to the construction site, and it is possible to reduce costs related to transport of the form.

A connecting member according to a third aspect of the present invention is a connecting member that is used in the process for producing a concrete platform according to the above-mentioned present invention, including: an elongated member that is formed to have substantially the same length as the gap between the pair of side walls of the form; a fixing member that anchors the attachment part to the elongated member; and a projecting part that comprises an adjusting part that enables the attachment part to move along the top surface of the table-deck portion that is formed by pouring concrete into the form.

According to the connecting member of the third aspect of the present invention, the connecting member is composed of an elongated member, thereby affording weight saving. By doing so, the connecting member can easily be attached to and detached from the form. In addition, by using the adjusting parts, the arrangement positions of the attachment parts are two-dimensionally adjustable along the top surface of the table-deck portion, in other words, in the horizontal plane.

Advantageous Effects of Invention

A concrete platform according to a fourth aspect of the present invention is provided, on a top part, with a table-deck portion that is formed by a form, a filling unit, and an attachment part, wherein the form has a cross-sectional U-shape, and is formed by a pair of side walls and a bottom plate that connects the pair of side walls, and is further provided with a connecting member that engages the top end parts of the side walls and is provided with side plates that are engaged by both ends of the side walls so as to sandwich the side walls, and is provided with reinforcing members that are formed on a line that extends in a longitudinal direction inside the side walls and inside the bottom plates.

According to the concrete platform according to the fourth aspect of the present invention, a structure is formed in which the reinforcement members are disposed inside the side walls and the bottom plate of the form, and the side walls are joined by the connecting member. Thus, a reduction in the stiffness of the form can be prevented. In addition, because the form can be produced at a location separate from the pier of the platform, a reduction in the construction completion time of the concrete platform can be implemented.

The concrete platform according to a fourth aspect of the present invention preferably includes an elongated member that is formed to have substantially the same length as the width of the gap between the pair of side walls of the form; a first adjusting part that enables inserting an attachment part into the elongated member; and projecting portions that are each provided with a second adjusting part that enables the attachment part to move along the top surface of the table-deck portion that is formed by pouring concrete into the form.

According to this configuration, weight saving can be achieved in the connecting member, and the position adjustment of the attachment part (embedded metal) is facilitated.

The form used in the concrete platform according to a fifth aspect of the present invention has a cross-sectional U-shape and is formed by a pair of side walls and a bottom plate that connects the pair of side walls, is further provided with a connecting part that has side plates that engage the top end part of the side walls and are joined by both ends of the side walls so as to sandwich the side walls, is provided with reinforcement members formed on a line that extends in a longitudinal direction inside the side walls and inside the bottom plate, and the connecting member includes an elongated member that is formed to have substantially the same length as the width of the gap between the pair of side walls of the form, and projecting portions that are each provided with an adjusting part that enables the attachment part to move along the top surface of the table-deck portion.

According to the form that is used in the concrete platform according to the fifth aspect of the present invention, because the reinforcement members are disposed inside the side walls and the bottom plate of the form and engage with connection plate, a reduction in the stiffness of the form can be prevented, and twisting of the form can be suppressed. Thus, support work becomes unnecessary and the construction completion time can be shortened.

According to a concrete platform production process, a concrete platform, and a connecting member of the present invention, form having a pair of concrete side walls and a concrete bottom slab that connects the pair of side walls is formed, and concrete is poured into the form after the form is set on a plurality of piers; therefore, advantages are afforded in that the construction period can be reduced, and an increase in the building costs can be prevented.

DESCRIPTION OF EMBODIMENTS

A platform according to an embodiment of this invention will be described with reference to FIGS. 1 to 9.

Figure 1:
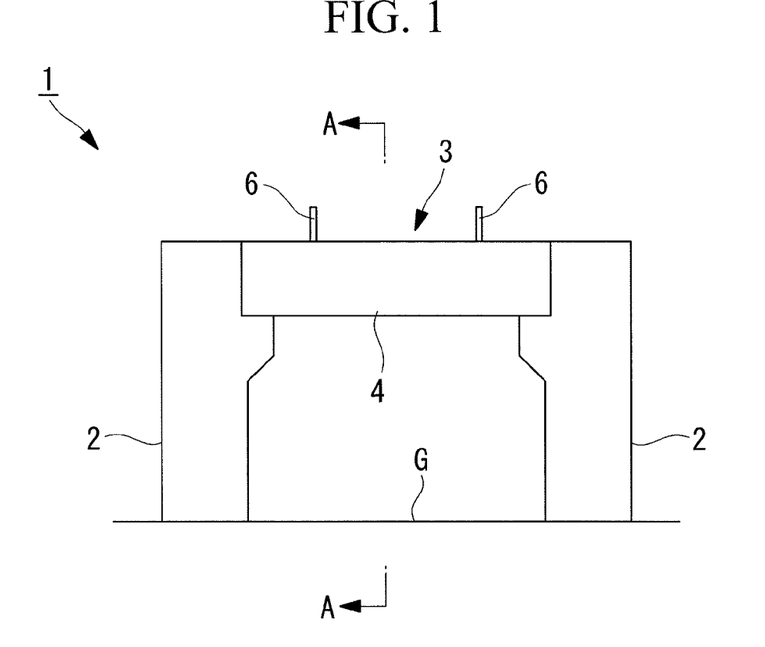
FIG. 1 is a schematic view for explaining the configuration of a turbine generator platform according to one embodiment of the present invention.

FIG. 1 is a schematic view for explaining the configuration of a turbine generator platform according to this embodiment.

A platform (concrete platform) 1 is a structure onto which a turbine (a steam turbine or a gas turbine) or a generator is mounted and is a structure mainly formed of concrete and reinforcing bars.

In this embodiment, the present invention is described as applied to the platform 1 onto which a turbine or a generator is mounted. However, the object to be mounted on the platform 1 is not limited to a turbine or a generator, and it includes other heavy structures, including those that vibrate during operation; it is not particularly limited.

As shown in FIG. 1, the platform 1 is mainly provided with a plurality of piers 2 and a table-deck portion 3.

As shown in FIG. 1, the piers 2 are members that extend upwards from the ground G, and are mainly formed of concrete and reinforcing bars to support the table-deck portion 3. Known structures can be used for the piers 2, and they are not particularly limited.

As shown in FIG. 1, the table-deck portion 3 is a beam member that is arranged over the upper ends (the ends at the upper side in FIG. 1) of the piers 2, and a turbine or a generator is mounted thereon.

Figure 2:
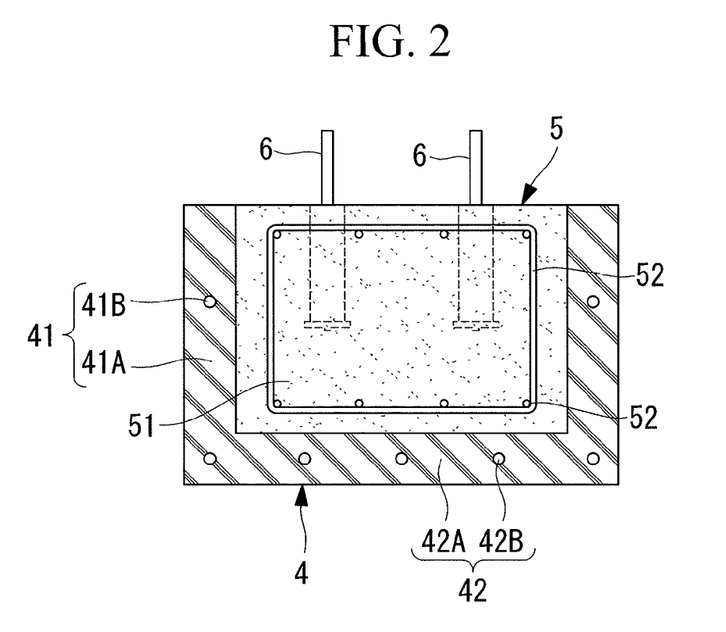
FIG. 2 is a sectional view, taken along line A-A, for explaining the configuration of the table-deck portion of FIG. 1.

FIG. 2 is a sectional view, taken along line A-A, for explaining the configuration of the table-deck portion in FIG. 1.

As shown in FIGS. 1 and 2, the table-deck portion 3 is mainly provided with form 4, a load portion 5, embedded metal parts (attachment parts) 6, and so forth.

As shown in FIG. 2, the form 4 forms the side surfaces and the bottom surface of the table-deck portion 3, and the load portion 5, the embedded metal parts 6, and so forth are arranged inside the form 4. Furthermore, the form 4 is formed so as to have a U-shaped cross-section, and so as to extend between the piers 2.

The form 4 is mainly formed of concrete and reinforcing bars, and as shown in FIG. 2, is produced in one integral form from a bottom slab 42 and a pair of side walls 41 that are erected on both edges of this bottom slab 42. The form 4 can have a size, for example, equal to or more than 2 m in width and equal to or more than 2 m in height.

The respective side walls 41 are formed into a plate shape, and they form the side surfaces of the table-deck portion 3 and also the side surfaces of the form 4. The side walls 41 can have a size of, for example, about 150 mm to 200 mm in plate thickness and equal to or more than 2 m in the height-wise dimension.

The side walls 41 are mainly provided with side-wall concrete portions 41A and side-wall tension parts 41B.

The side-wall concrete portions 41A mainly form the side walls 41, and they are precast concrete that has been poured separately from an inner concrete portion 51 in the load portion 5.

The side-wall tension parts 41B are linear reinforcing members extending in the longitudinal direction of the table-deck portion 3 (a direction perpendicular to the plane of the drawing in FIG. 2), and the side-wall tension parts 41B compress the side-wall concrete portions 41A in their longitudinal direction, by being arranged inside the side-wall concrete portions 41A in a state tensioned in the above-mentioned longitudinal direction.

This embodiment is described as applied to an example in which the side-wall tension parts 41B are arranged on the upper edge side of the side-wall concrete portions 41A (the upper edge portion side in FIG. 2).

The bottom slab 42 is formed into a plate-shape, and the bottom slab 42 forms the bottom surface of the table-deck portion 3 and also the bottom surface of the form 4. The bottom slab 42 can have a size of, for example, about 150 mm to 200 mm in plate thickness and equal to or more than 2 m in the width-wise dimension.

The bottom slab 42 is mainly provided with a bottom slab concrete portion 42A and bottom slab tension parts 42B.

The bottom slab concrete portion 42A mainly forms the bottom slab 42, and it is precast concrete that has been poured separately from the inner concrete portion 51 in the load portion 5.

The bottom slab tension parts 42B are linear reinforcing members extending in the longitudinal direction of the table-deck portion 3, and the bottom slab tension parts 42B compress the bottom slab concrete portion 42A in its longitudinal direction, by being arranged inside the bottom slab concrete portion 42A in a state tensioned in the above-mentioned longitudinal direction.

This embodiment is described as applied to an example in which a plurality of bottom slab tension parts 42B are arranged in one line, at equal intervals, within the bottom slab concrete portion 42A.

Known members, such as wires, reinforcing bars, and so forth, can be used as the side-wall tension parts 41B and the bottom slab tension parts 42B, and they are not particularly limited.

This embodiment illustrates an example in which the side walls 41 and the bottom slab 42 forming the form 4 are produced in one integral form; however, the embodiment is not particularly limited to this form, and separately produced ones may be connected.

The load portion 5 is arranged inside the form 4 to form the table-deck portion 3 together with the form 4 and supports a turbine or a generator that is mounted on the table-deck portion 3.

The load portion 5 is mainly provided with the inner concrete portion 51 and inner reinforcing bars 52.

The inner concrete portion 51 mainly forms the load portion 5 and mainly receives force related to compressive stress among the forces acting on the table-deck portion 3. Furthermore, the inner concrete portion 51 is formed by pouring concrete into the form 4 and is formed separately from the side-wall concrete portions 41A and the bottom slab concrete portion 42A of the form 4.

The inner reinforcing bars 52 are linear reinforcing members that have been placed throughout the load portion 5 and that mainly receive the force related to tensile stress among the force acting on the table-deck portion 3. Any known arrangement pattern can be used for the inner reinforcing bars 52, and it is not particularly limited.

As shown in FIGS. 1 and 2, the embedded metal parts 6 are partially embedded in the top surface (the surface on the upper side in FIG. 1) of the table-deck portion 3 and are used for fixing a turbine or a generator that is to be mounted on the table-deck portion 3. Examples of the embedded metal parts 6 can include anchor bolts, anchor blocks and so forth.

A construction step (production process) of the platform 1 having the above-mentioned configuration will be explained below.

Figure 3:
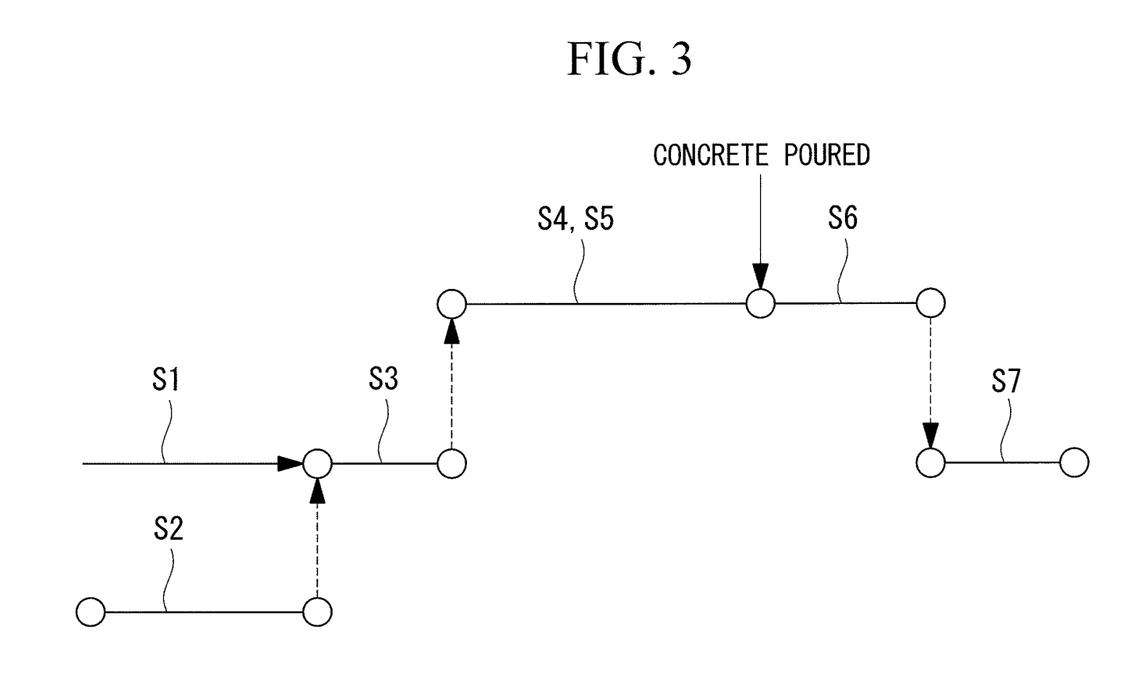
FIG. 3 is a view for explaining construction steps of the platform in FIG. 1.
Figure 4:
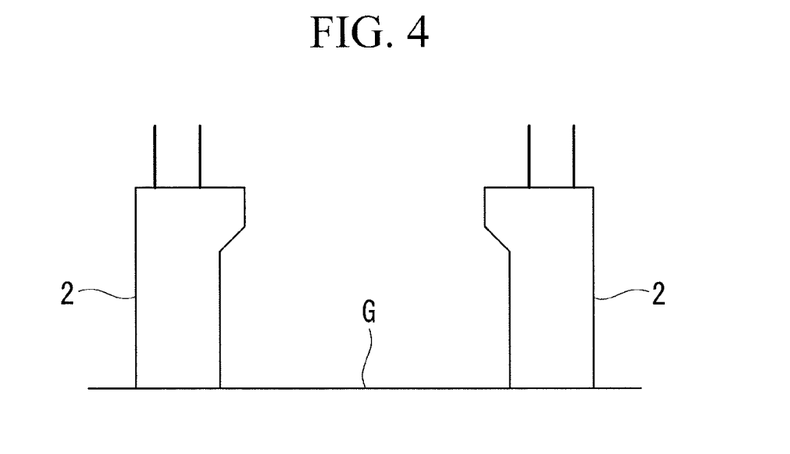
FIG. 4 is a schematic view for explaining a state in which piers in FIG. 1 are constructed.
Figure 5:
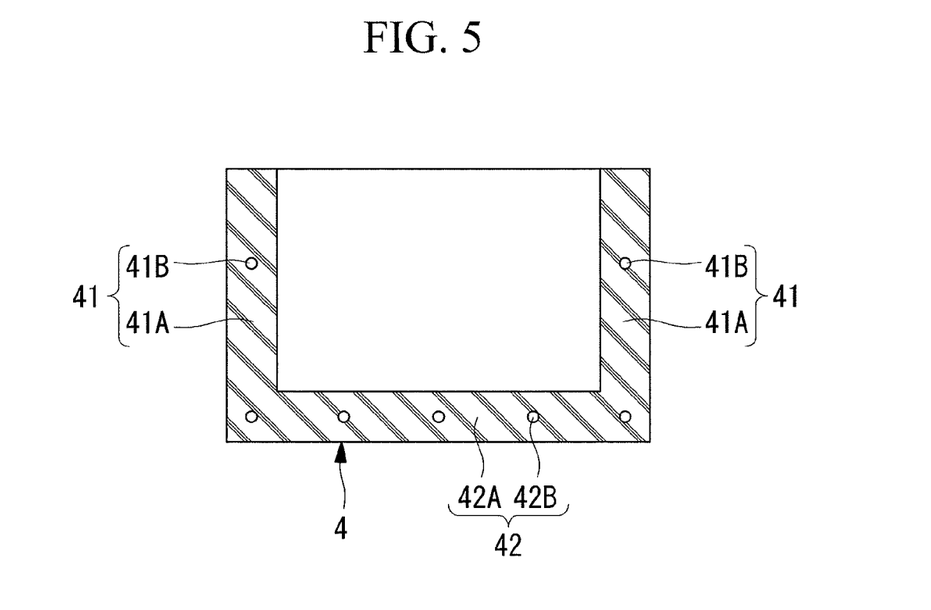
FIG. 5 is a sectional view for explaining the configuration of form in FIG. 1.

FIG. 3 is a view for explaining a construction step of the platform in FIG. 1. FIG. 4 is a schematic view for explaining a state in which the piers in FIG. 1 are constructed. FIG. 5 is a sectional view for explaining the configuration of the form in FIG. 1.

As shown in FIGS. 3 and 4, in the construction of the platform 1 of this embodiment, a step for constructing the piers 2 (Step S1) is conducted, and as shown in FIGS. 3 and 5, a step for forming the form 4 (Step S2) is conducted concurrently.

As shown in FIG. 4, in the step for constructing the piers 2, a plurality of piers 2 are constructed on the ground G.

On the other hand, as shown in FIG. 5, in the step for forming the form 4, the form 4, having the pair of side walls 41 and the bottom slab 42 that are arranged in the U-shape, is formed at a different site from the construction site of the platform 1. More specifically, when the side-wall concrete portions 41A of the side walls 41 and the bottom slab concrete portion 42A of the bottom slab 42 are formed, the side-wall tension parts 41B and the bottom slab tension parts 42B are respectively embedded in a longitudinal tensioned state. By doing so, compressive stress in the longitudinal direction is applied to the side-wall concrete portions 41A and the bottom slab concrete portion 42A.

By doing so, for example, even when the table-deck portion is deformed downward and tensile force acts on the form 4 that forms the side surfaces and the bottom surface of the table-deck portion, because the compressive stress is pre-applied to the side-wall concrete portions 41A and the bottom slab concrete portion 42A, the tensile stress is prevented from acting, or the tensile stress is reduced.

The thus-formed form 4 is transported to the construction site of the piers 2, in other words, the construction site of the platform 1, by transportation means, such as a trailer.

Figure 6:
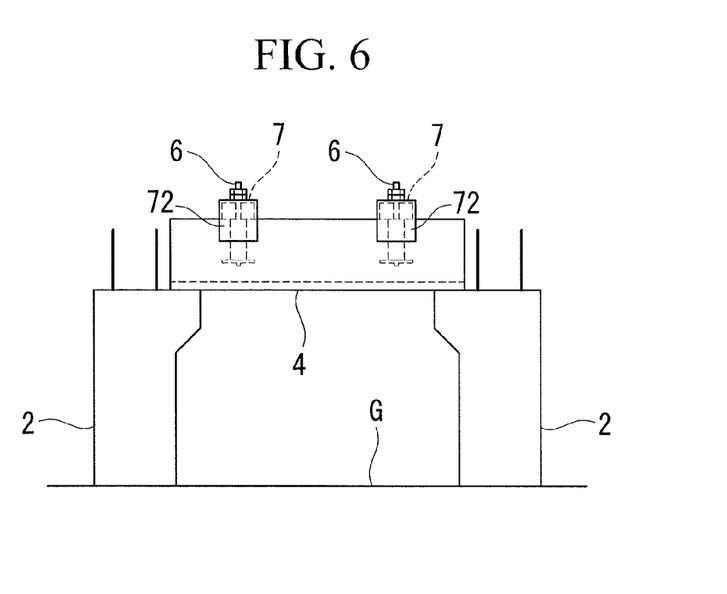
FIG. 6 is a schematic view for explaining a state in which the form is set on the piers in FIG. 4.

FIG. 6 is a schematic view for explaining a state in which the form is placed on the piers of FIG. 4.

Once the form 4 is transported to the construction site of the platform 1, a step of setting the form 4 on the piers 2, as shown in FIGS. 3 and 6, is conducted (Step S3).

Figure 7:
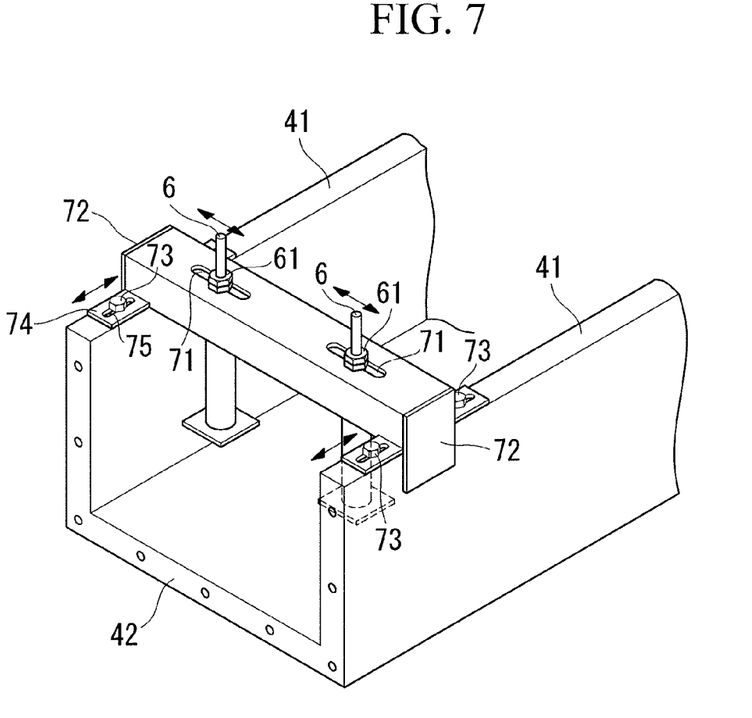
FIG. 7 is a perspective view for explaining the configuration of the form that is set on the piers in FIG. 6.

FIG. 7 is a perspective view for explaining the configuration of the form that is set on the piers in FIG. 6.

As shown in FIG. 7, when the form 4 is set on the piers 2, an upper-surface connecting part (connecting member) 7 is set on the form 4. The upper-surface connecting part 7 is arranged over the upper edge portions of the side walls 41 of the form 4 so as to connect the upper edge portions of the pair of side walls 41.

The upper-surface connecting part 7 is an elongated member that is formed to have substantially the same length as the gap between the pair of side walls 41 of the form 4. The upper-surface connecting part 7 is provided with two slotted holes 71 that extend in the longitudinal direction of the upper-surface connecting part 7 so as to be aligned along the longitudinal direction.

In addition, the upper-surface connecting part 7 is provided with, on the four corners thereof, projecting portions 74, each having a slotted hole 75 that extends in the width-wise direction of the upper-surface connecting part 7. The embedded metal parts 6 are anchored to the upper-surface connecting part 7 by being fastened by nuts 61 in a state inserted though the slotted holes 71.

By attaching the upper-surface connecting part 7, the part of the form 4 having a U-shaped cross-section forms a box-structure; therefore, it is possible to prevent a reduction in the sectional stiffness due to widening of the gap between the side-wall edge portions (the upper edges). Therefore, when the form 4 is hoisted, when the form 4 is set on a plurality of piers 2, and then, when concrete is poured into the form 4 to form the inner concrete portion 51, because the gap between the upper edges of the side walls 41 does not become wider, the form 4 becomes more resistant to deformation.

The upper-surface connecting part 7 is attached to the form 4, for example, as described below.

The upper-surface connecting part 7 is first positioned such that the upper-surface connecting part 7 is set over the upper edge portions of the pair of side walls 41. Next, as shown in FIG. 7, anchor bolts 73 are inserted into the respective slotted holes 75 provided in the projecting portions 74. Then, these anchor bolts 73 are fastened to the upper edge portions of the pair of side walls 41.

Side panels 72 are bonded to both side surfaces (both end surfaces in longitudinal direction) of the upper-surface connecting part 7 by welding or another bonding process. Here, only the upper half portions of the side panels 72 are bonded. Therefore, the lower portions of the side panels 72 can hold the pair of side walls 41 from both sides. In this way, the side panels 72 and the anchor bolts cooperate to prevent the gap between the upper edges of the side walls 41 from being widened.

In the case of steel form, in order to prevent a reduction in the sectional stiffness, stiffening parts for maintaining the relative positions between the side walls 41 and the bottom slab 42 may be provided on the bonding portions between the side walls 41 and the bottom slab 42. However, by providing the stiffening parts, the cross-sectional area of the interior of the form 4, in other words, the inner concrete portion 51, becomes smaller, and the space available for arranging the reinforcing bars 52 will be limited.

In addition, the reinforcing bars 52 will not be arranged in the vicinity of the bottom slab 42 within the inner concrete portion 51 where the bending stress is large; as a result, there is a possibility that the strength of the table deck will be lowered. In the case of concrete form, which has a greater thickness compared with steel form, the impact is particularly significant.

This problem can be solved by connecting the upper edge portions of the pair of side walls by using the upper-surface connecting part 7 according to the present invention. By attaching the upper-surface connecting part 7 so as to be set over the pair of side walls 41 in this way, when the form 4 is hoisted by a crane and when concrete is poured into the form 4 to form the inner concrete portion 51, the gap between the upper edge portions of the pair of side walls 41 is prevented from being widened.

Figure 8:
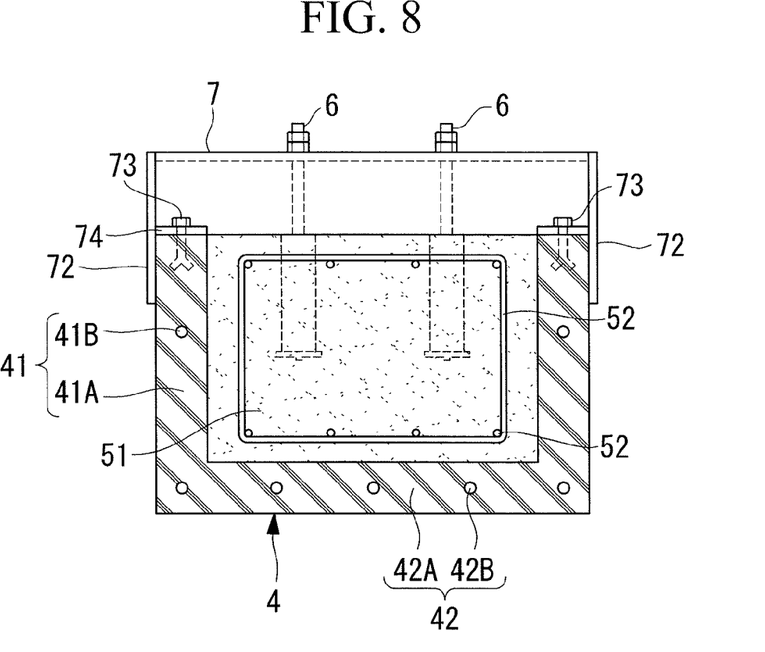
FIG. 8 is a sectional view for explaining the configuration of the form in FIG. 6 before inner concrete is poured.

FIG. 8 is a sectional view for explaining the configuration of the form of FIG. 6 before the inner concrete is poured.

Furthermore, as shown in FIG. 8, the inner reinforcing bars 52 of the load portion 5 are arranged inside the form 4.

At the same time, as shown in FIG. 7, the embedded metal parts 6 are supported by the slotted holes 71 provided in the upper-surface connecting part 7, and the arrangement positions of the embedded metal parts 6 are maintained by the upper-surface connecting part 7.

Figure 9:
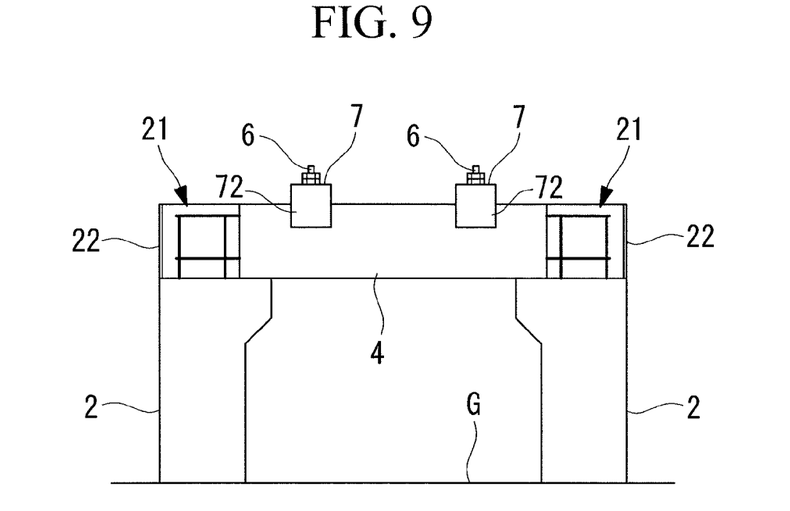
FIG. 9 is a schematic view for explaining a state for constructing connecting portions between the piers and the form.

FIG. 9 is a schematic view for explaining a state for constructing connecting portions between the piers and the form.

As shown in FIGS. 3 and 9, a step of constructing connecting portions 21 is conducted after the form 4 is set on the piers 2 (Step S4).

The connecting portions 21 connect the piers 2 with the form 4, in other words, with the table-deck portion 3, and connect both end portions of the form 4 with the upper ends of the piers 2.

More specifically, the construction is conducted as described below.

The form 4 is first placed on the two piers 2 such that the form 4 is set on the two piers 2. Next, the reinforcing bars provided inside the form 4 and the reinforcing bars sticking out from the upper ends of the piers 2 are connected by reinforcing bars for connection. Then, form 22 is set around the space in which the connected reinforcing bars are positioned.

Thereafter, as shown in FIG. 3, a step of adjusting the arrangement positions of the embedded metal parts 6 is conducted (Step S5). For example, as shown in FIG. 7, the arrangement positions of the embedded metal parts 6 are adjusted by moving the embedded metal parts 6 along the slotted hole 71 of the upper-surface connecting part 7.

Furthermore, by loosening the two anchor bolts 73, the upper-surface connecting part 7 can be shifted in its widthwise direction to achieve fine adjustment. By doing so, two-dimensional fine adjustment of the embedded metal parts 6 in the horizontal plane can be conducted.

In this embodiment, although a configuration in which the slotted holes 71 extend in the longitudinal direction of the upper-surface connecting part 7 and the slotted holes 75 extend in the width-wise direction of the upper-surface connecting part 7 is illustrated, a configuration in which the slotted holes 71 extend in the width-wise direction of the upper-surface connecting part 7 and the slotted holes 75 extend in the longitudinal direction of the upper-surface connecting part 7 is also possible.

Thereafter, as shown in FIG. 3, concrete is poured into the form 4 to form the inner concrete portion 51, and at the same time, concrete is also poured into the form 22, and a concrete curing step is conducted (Step S6).

As shown in FIG. 2, once the concrete is poured into the form 4 to form the inner concrete portion 51, the interior of the form 4 is filled with the inner concrete portion 51 to form the load portion 5, and parts of the embedded metal parts 6 are embedded in the inner concrete portion 51.

Thereafter, while the poured concrete is curing, a step of removing the scaffolding set around the platform 1 is conducted (Step S7), and subsequently, the upper-surface connecting part 7 is removed from the side walls 41 by removing the anchor bolt 73. Thus, the platform 1 as shown in FIG. 1 is completed.

According to the configuration described above, a step of forming the form 4 and a step of building a plurality of piers 2 can be conducted simultaneously, and at the same time, the form 4 can be made at a different site from the construction site of the plurality of piers 2, in other words, the construction site of the platform 1. Therefore, a reduction in the construction period, that is, the production period of the platform 1, can be achieved.

Furthermore, because the form 4 is made of concrete, the form 4 is not required to be removed after the concrete has been poured into the form 4 to form the inner concrete portion 51, and therefore, the construction period can be reduced.

In addition, when form made of steel plates is used, it is necessary to perform welding management, and it is necessary to make the form in a factory in order to ensure dimensional precision. In contrast, when form made of concrete is used, it is not necessary to perform welding management etc. Therefore, the site for producing the form is not limited to the factory; the form can be produced at a suitable site close to the construction site, and it is possible to reduce the costs related to transport of the form.

On the other hand, because concrete is poured to form the inner concrete portion 51 after the form 4 having the pair of side walls 41 and the bottom slab 42 has been set on the piers, a reduction in the size of a crane used for setting the form can be afforded compared with a case where the form 4 is set on the piers 2 after concrete has been poured to form the inner concrete portion 51.

By connecting each of the edge portions of the pair of side walls 41 with the upper-surface connecting part 7, a part of the cross-section of the form 4 forms a box-structure; therefore, it is possible to prevent a reduction in the sectional stiffness of the form 4 due to the widening of the gap between the edge portions (upper edges) of the side walls 41. Therefore, deformation of the form 4 during pouring of the concrete for the inner concrete portion 51 is prevented, and no supports for supporting the form 4 need to be set.

Because the embedded metal parts 6 are supported with the slotted holes 71 of the upper-surface connecting part 7, it is possible to align the embedded metal parts 6 easily and with high precision without using a separate massive template and temporary supporting members that temporarily support this template from above. Furthermore, the construction period can be reduced compared with a process where the embedded metal parts 6 are arranged directly in the form 4 and their arrangement positions are adjusted.

In addition, as shown in FIG. 7, the upper-surface connecting part 7 is composed of an elongated member, thereby achieving weight saving. By doing so, the upper-surface connecting part 7 can easily be attached to and detached from the form 4. In addition, because the upper-surface connecting part 7 is finely adjustable in two dimensions in the planar direction of the region that will form the top surface of the table-deck portion 3 after concrete has been poured, the positions of the embedded metal parts 6 are two-dimensionally adjustable in the horizontal plane by using this fine adjustment.

The process of constructing the table-deck portion 3 using the above-described form 4 can also be applied to the construction of the piers 2, and it is not particularly limited.

REFERENCE SIGNS LIST 1 platform (concrete platform)
2 pier
3 table-deck portion
4 form
6 embedded metal part (attachment part)
7 upper-surface connecting part (connecting member)
41 pair of side walls
42 bottom slab
51 inner concrete portion
61 nut (fixing member)
71 slotted hole (adjusting part)
75 slotted hole (adjusting part)
S2 step (Step for forming form)
S3 step (Step for setting form)
S6 step (Step for pouring concrete)

The invention claimed is:

1. A process for producing a concrete platform on which an object to be supported is fixed, comprising:

a step of forming a form having a pair of concrete side walls and a concrete bottom slab that connects the pair of side walls so that each of the concrete side walls and the concrete bottom slab is provided thereinside with a linear reinforcing member that extends in a longitudinal direction of the form;

a step of setting the form on a plurality of piers after a connecting member that connects each of an upper edge portion of each of the side walls of the form by being placed on the upper edge portions is attached to the pair of side walls; and a step of pouring concrete into the form that is set on the plurality of piers.

2. A process for producing a concrete platform according to claim 1, wherein an attachment part that is partially embedded in the concrete that is poured into the form so as to fix the object to be supported is aligned with the connecting member in a positionable manner.

3. A process for producing a concrete platform according to claim 1, wherein the connecting member is removed from the upper edge portions of the pair of side walls after the step of pouring concrete.

4. A process for producing a concrete platform according to claim 1, wherein, in the step of forming the form, the linear reinforcing member is arranged inside each of the concrete side walls and the concrete bottom slab in a state in which each linear reinforcing member is tensioned in the longitudinal direction when the concrete for the form is poured to form the concrete side walls and the concrete bottom slab.

5. A process for producing a concrete platform according to claim 4, wherein, in the step of setting the form on the plurality of piers, the form is set on the plurality of piers after a connecting member that connects each of upper portions of the pair of side walls of the form by being placed on upper edge portions is attached to the pair of side walls.

6. A process for producing a concrete platform according to claim 5, wherein an attachment part that is partially embedded in the concrete that is poured into the form so as to fix the object to be supported is aligned with the connecting member in a positionable manner.

7. A process for producing a concrete platform according to claim 1, wherein the connecting member is removed from the upper edge portions of the pair of side walls after the step of pouring concrete.

8. A process for producing a concrete platform according to claim 1, further comprising the step of disposing inner reinforcing bars as an inner set of linear reinforcing members within an interior of the form so as to be enclosed in the concrete poured into the form.

9. A process for producing a concrete platform according to claim 1, further comprising connecting the reinforcing bars provided in the sidewalls of the form with reinforcing bars sticking out from upper ends of the piers, using connecting the reinforcing bars, and further enclosing spaces in which the connected reinforcing bars are positioned, with space enclosing forms.

* * * * *